No. 645,375. Patented Mar. 13, 1900.
P. T. SIEVERT.
APPARATUS FOR PRODUCING HOLLOW GLASS ARTICLES.
(Application filed Nov. 22, 1899.)
(No Model.)
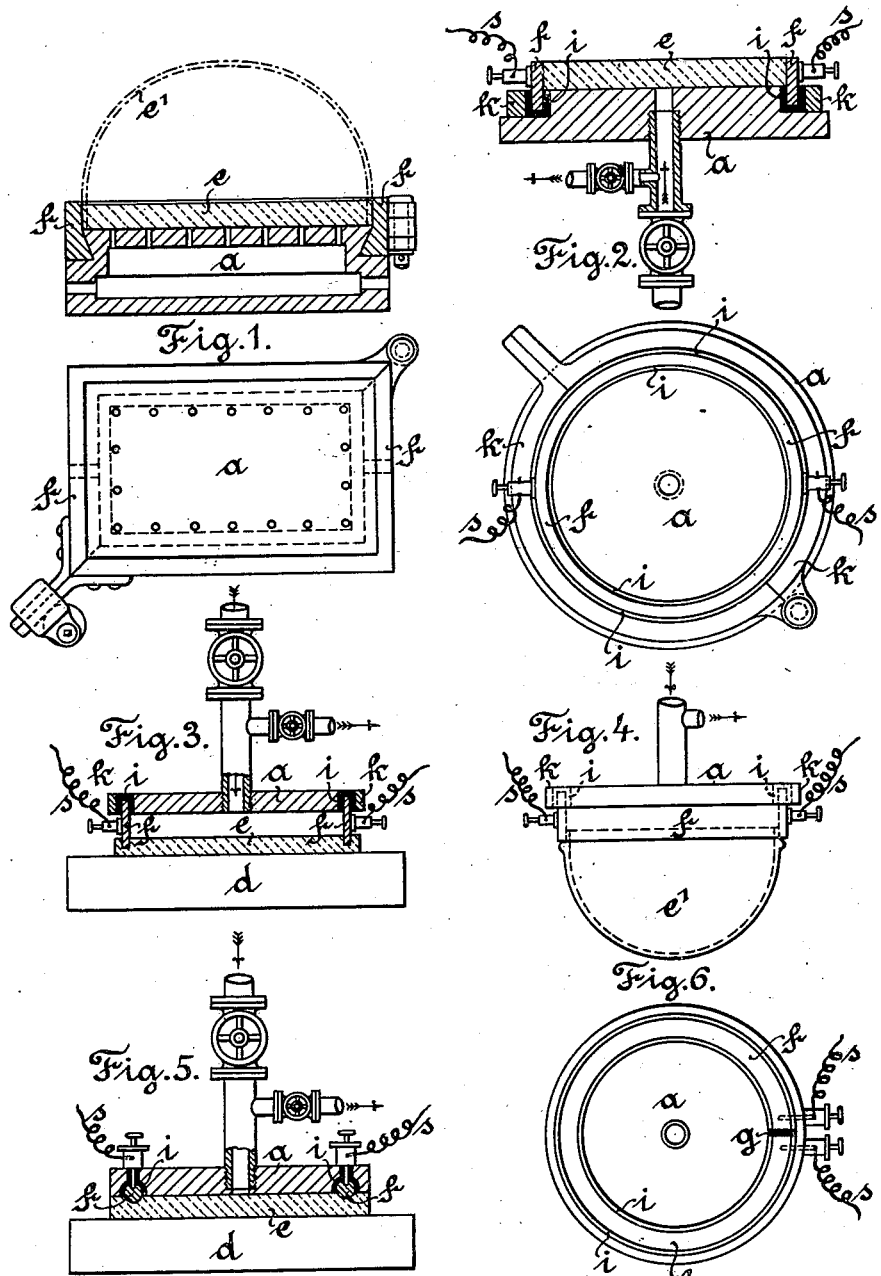

UNITED STATES PATENT OFFICE.

PAUL THEODOR SIEVERT, OF DRESDEN, GERMANY.

APPARATUS FOR PRODUCING HOLLOW GLASS ARTICLES.

SPECIFICATION forming part of Letters Patent No. 645,375, dated March 13, 1900.

Application filed November 22, 1899. Serial No. 737,876. (No model.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in Apparatus for the Production of Hollow Glass Articles, of which the following is a specification.

This invention relates to an improvement in that class of apparatus for the production of hollow glass articles which consists of a perforated slab or plate upon which a plastic layer of glass is spread out and a shape-giving frame which holds the said layer on said plate along or around certain suitable or desired outlines while the portion of the layer circumscribed within said outlines is expanded by an elastic pressure medium to form the article or articles to be produced. A disadvantage has heretofore presented itself in many cases in the use of such apparatus from the contact of the glass mass with the frame or mold, cooling the glass too rapidly. The consequence of this is that a sort of irregular thickening is produced during the blowing process at the base-lines of the hollow body or article, which when manufacturing thick-sided articles is of no harm, but is often, on the other hand, desirable. When, however, manufacturing articles with thin sides—for instance, cylinders for sheet-glass production—an excess of glass material is used, to the detriment of the article produced. The same disadvantage arises when jointed frames are employed for the pouring of the necessary amount of molten glass onto the slab or plate.

The object of the present invention is to do away with this disadvantage and at the same time to effect a considerable simplification of the apparatus employed. With this view I provide for the special heating of the shape-giving frames, which hold the glass mass securely on the perforated slab or plate to such an extent that the glass mass sticks to said frames—that is to say, that the said frames will apply heat at the base-lines of the articles to be produced in the same way as the glass mass does to the heated "head" of a glass-blower's tube when commencing to blow out the glass. This heat-applying or heating frame will replace the holding or shape-giving frame first mentioned and will in like manner give the shape of the hollow glass article to be produced at its base-line. It will hold the glass at this line during the blowing operation, while it will simultaneously by its heat prevent the glass from cooling at this line and will thereby materially aid in the uniformity of thickness in the walls of the hollow article produced.

In further explanation of the invention I will now refer to the accompanying drawings, in which—

Figure 1 represents a vertical sectional view and a plan of one form of apparatus included in my invention; Fig. 2, a vertical sectional view and a plan of another form of apparatus embodying my invention. Figs. 3 and 4 represent, respectively, a vertical sectional view and a side view of another form of such apparatus. Figs. 5 and 6 represent, respectively, a vertical sectional view and an inverted plan of still another form of such apparatus.

Fig. 1 shows the perforated slab $a$ fitted at its margin with the heat-applying and shape-giving frame $f$, within which lies the glass layer $e$. The dotted lines $e'$ represent the blown-up glass body held fast by the heat-applying frame. The loosening of the produced hollow glass body from the frame follows in the known manner either by breaking off or lifting off with a wet thread laid around it. The heating of the frame $f$ may be effected either through insertion in a furnace, by jet-flames, or, better still, by the use of an electric current while it is in place on the slab $a$. The latter method of heating is the least troublesome and offers the very great advantage that not alone is the necessary temperature quickly produced at the exact place at which it is required, but it may also be maintained at the same height or raised, if required, during the glass-blowing process. The temperature of the frame is also capable of being raised to such an extent that the separation of the already-formed articles from the frame may be effected easily by means of a pair of shears or otherwise.

Fig. 2 shows the perforated slab or plate $a$, with the frame $f$, in connection with an electric current or source of electricity. $k$ is a clamping-frame which clamps the frame $f$ onto the slab $a$. $i$ is the insulating medium between the plate $a$ and the frame $f$. It will be evident, of course, for the construction of these frames metals will be employed possessing a high melting-point and which offer most resistance to the electric current, so that a glow heat may rapidly be produced. The employment of heat-applying frames for the holding fast of the glass mass may take place as well for the production of several hollow articles at one time as for single articles. As now a downward blowing for hollow articles has proved itself more advantageous in some cases than the blowing upward by reason of the automatic drawing action of the glass mass, the important simplification now to be described and which is represented in Figs. 3 and 4 may be employed when using the heating-frames above referred to. By means of casting, rolling, or pressing there will be formed upon a massive plate $d$, in the well known manner, a plastic glass layer $e$ of about the same surface extent as the frame $f$ to be employed. Upon this still plastic glass layer the operator presses from above the heat-applying frame $f$, secured upon the plate $a$. The glass layer sticks fast to the heat-applying frame. The operator now either first lifts the plate $a$, with the glass layer $e$ attached, and then draws away the massive plate $d$ sidewise, or else he pushes the plate $a$, with the glass layer $e$ to one side in such manner that the said glass layer will be free underneath in order by means of the air-pressure coming through the perforated plate $a$ to blow out in a downward direction in the form of the desired hollow body $e'$.

The frame $f$ to be heated may be of any desired section. It may be quadrangular, round, or oval in cross-section. It may also be, as shown, by way of example, in Fig. 5, so embedded in an insulated position in the plate $a$ that it will only project to a slight extent over the upper surface of the plate $a$, as shown in Fig. 5.

The supply of the current to $f$, (whether annular or of other form,) embedded in the insulating medium $i$, may be conducted thereto by insulated metal rods adapted to the plate $a$, and to which rods the current-wires are held in contact by binding-screws. On heating the ring or metal frame $f$ the plastic glass layer attaches itself thereto, ready to expand inside the ring on the application of a pressure medium at the back of the said layer.

As represented in Fig. 6, (view of a plate $a$ from below,) the ring or metal frame $f$ may be divided at $g$, in which case the opposite ends will be separated by a block or layer of insulating medium. One of the current-wires $s$ is then connected to each end thereof, so that the whole ring or frame becomes a conductor except for the small division referred to.

In all the examples of my invention heat is imparted to the glass through the medium of the frame $f$ directly along or around the desired outlines of the base of the article to be blown, and the heat so imparted is applied to the frame independently of that applied to any other part of the apparatus or of that residing in the glass layer itself.

What I claim as my invention is—

1. In an apparatus for the manufacture of hollow glass articles, the combination of a slab or plate adapted to receive a layer of plastic glass and perforated for the passage through it of an elastic pressure medium for blowing out said layer, and a heating-frame conforming to the outline of the base or walls of the article to be produced for giving shape to said article and at the same time applying heat thereto along or around said outline, substantially as herein described.

2. In an apparatus for the manufacture of hollow glass articles, the combination of a slab or plate adapted to receive a layer of plastic glass and perforated for the passage through it of an elastic pressure medium for blowing out said layer, a frame for holding said layer to the slab or plate along suitable outlines, and means for applying heat to said frame during the blowing out of the said layer for heating said layer along said outlines independently of heat applied to or residing in other parts of said layer, substantially as herein described.

3. In an apparatus for the manufacture of hollow glass articles, the combination of a slab or plate adapted to receive a layer of plastic glass and perforated for the passage through it of an elastic pressure medium for blowing out said layer, a frame for holding said layer to the slab or plate along determined outlines, and electrical connections with said frame for heating the same and keeping it heated during the blowing out of said layer, substantially as herein described.

4. In an apparatus for the manufacture of hollow glass articles, the combination of a slab or plate adapted to receive a layer of plastic glass and perforated for the passage through it of an elastic pressure medium for blowing out said layer, a frame partly embedded in said slab or plate and insulated therefrom for holding the said layer thereto along determined outlines, and electrical connections with said frame for heating the same and keeping it heated during the blowing out of said layer, substantially as herein described.

In testimony that I claim the foregoing as my invention I have signed my name, in presence of two witnesses, this 7th day of November, 1899.

PAUL THEODOR SIEVERT.

Witnesses:
PAUL ARRAS,
WILHELM WIESENHÜTTER.